(12) United States Patent
Caban (10) Patent No.: US 9,519,550 B1
(45) Date of Patent: Dec. 13, 2016

(54) PERSISTENT CLIENT-TO-REPLICATION SYSTEM COMMUNICATIONS

(71) Applicant: EMC Corporation, Hopkinton, MA (US)

(72) Inventor: Angel Luis Caban, Shirley, MA (US)

(73) Assignee: EMC CORPORATION, Hopkinton, MA (US)

( * ) Notice: Subject to any disclaimer, the term of this patent is extended or adjusted under 35 U.S.C. 154(b) by 284 days.

(21) Appl. No.: 14/499,499

(22) Filed: Sep. 29, 2014

(51) Int. Cl.
*G06F 17/30* (2006.01)
*G06F 11/14* (2006.01)
*H04L 29/08* (2006.01)

(52) U.S. Cl.
CPC ..... *G06F 11/1458* (2013.01); *G06F 17/30575* (2013.01); *H04L 67/1095* (2013.01)

(58) Field of Classification Search
CPC ................ G06F 17/30073; G06F 17/30; G06F 17/30067; G06F 17/00; G06F 17/30575
USPC .................................................. 707/600–899
See application file for complete search history.

(56) References Cited

U.S. PATENT DOCUMENTS

2013/0173553 A1* 7/2013 Apte ................. G06F 7/00
707/640

* cited by examiner

*Primary Examiner* — Isaac M Woo
(74) *Attorney, Agent, or Firm* — Daly, Crowley, Mofford & Durkee, LLP (57) ABSTRACT

In one aspect, a method includes generating a secure connection with a replication system using credentials, receiving a user-initiated command to control the replication system, generating a connection object, determining if the connection to the replication system has been initiated, sending the command to the replication system if the connection is initiated, obtaining input from a character stream to process and processing data for use by a backup system.

17 Claims, 6 Drawing Sheets

PERSISTENT CLIENT-TO-REPLICATION SYSTEM COMMUNICATIONS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes generating a secure connection with a replication system using credentials, receiving a user-initiated command to control the replication system, generating a connection object, determining if the connection to the replication system has been initiated, sending the command to the replication system if the connection is initiated, obtaining input from a character stream to process and processing data for use by a backup system.

In another aspect, an apparatus includes electronic hardware circuitry configured to generate a secure connection with a replication system using credentials, receive a user-initiated command to control the replication system, generate a connection object, determine if the connection to the replication system has been initiated, send the command to the replication system if the connection is initiated, obtain input from a character stream to process and process data for use by a backup system.

In a further aspect, an article includes a non-transitory computer-readable medium that stores computer-executable instructions. The instructions cause a machine to generate a secure connection with a replication system using credentials, receive a user-initiated command to control the replication system, generate a connection object, determine if the connection to the replication system has been initiated, send the command to the replication system if the connection is initiated, obtain input from a character stream to process and process data for use by a backup system.

DETAILED DESCRIPTION

Current backup and recovery implementation that exploits a replication system uses a scheme of spawning external processes to execute replication commands remotely for every user-initiated backup or recovery request. This costs the backup and recovery processes considerable time and resources (such as system file descriptors, opened sockets and network ports). This scheme degrades performance to ever-compounding results as the process space increases and finite resources such as network ports decrease. As a result, customers with modern, sophisticated storage protection environments that use replication systems do not have a scalable solution, since increasing number of Consistency Groups and Volumes require increased use of server resources.

Described herein are techniques to provide a scalable implementation that can perform multiple serial replication commands in near-constant time using near-constant server resources, thereby alleviating the user's need to provide more resources to the backup and recovery process as their data protection needs also grow.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 1:
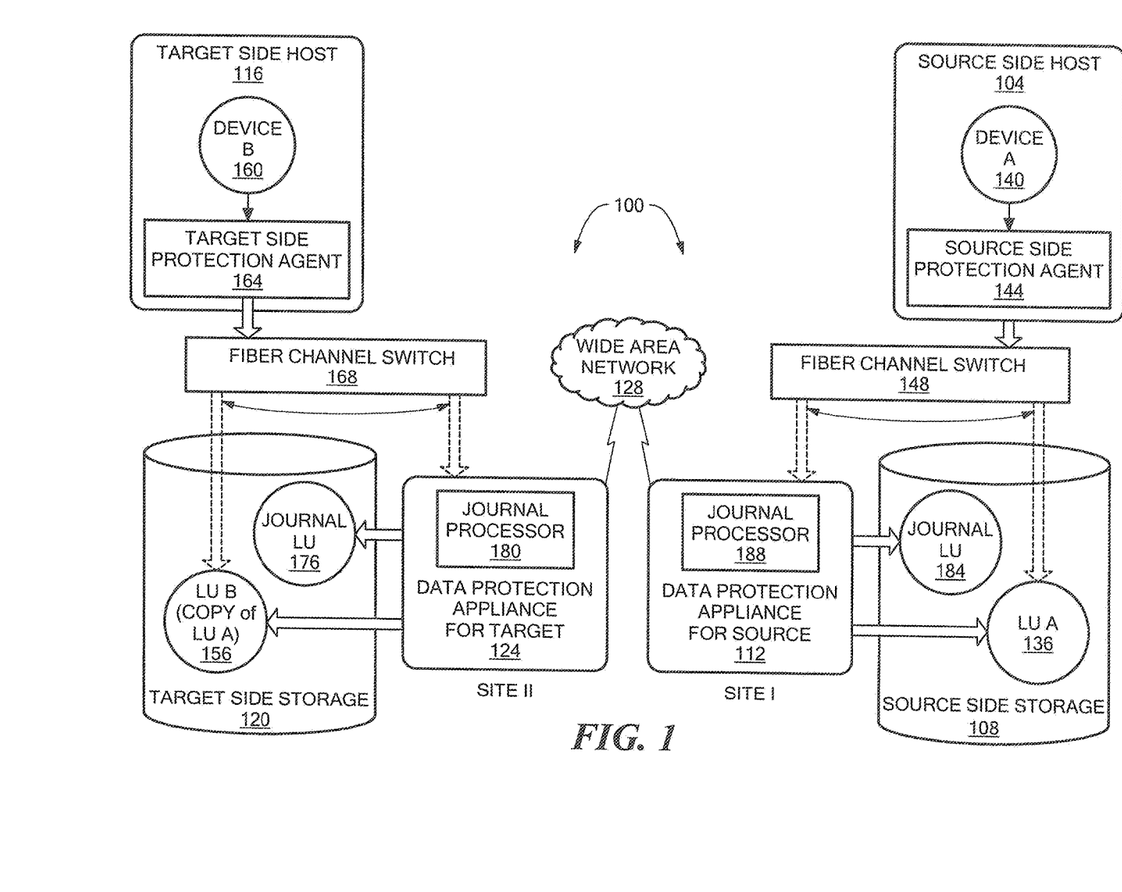
FIG. 1 is a block diagram of an example of a data protection system.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site H may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command is complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B, updates the journal entries in the journal LU with undo information, applies the journal transactions to LU B, and removes already-applied transactions from the journal.

Figure 2:
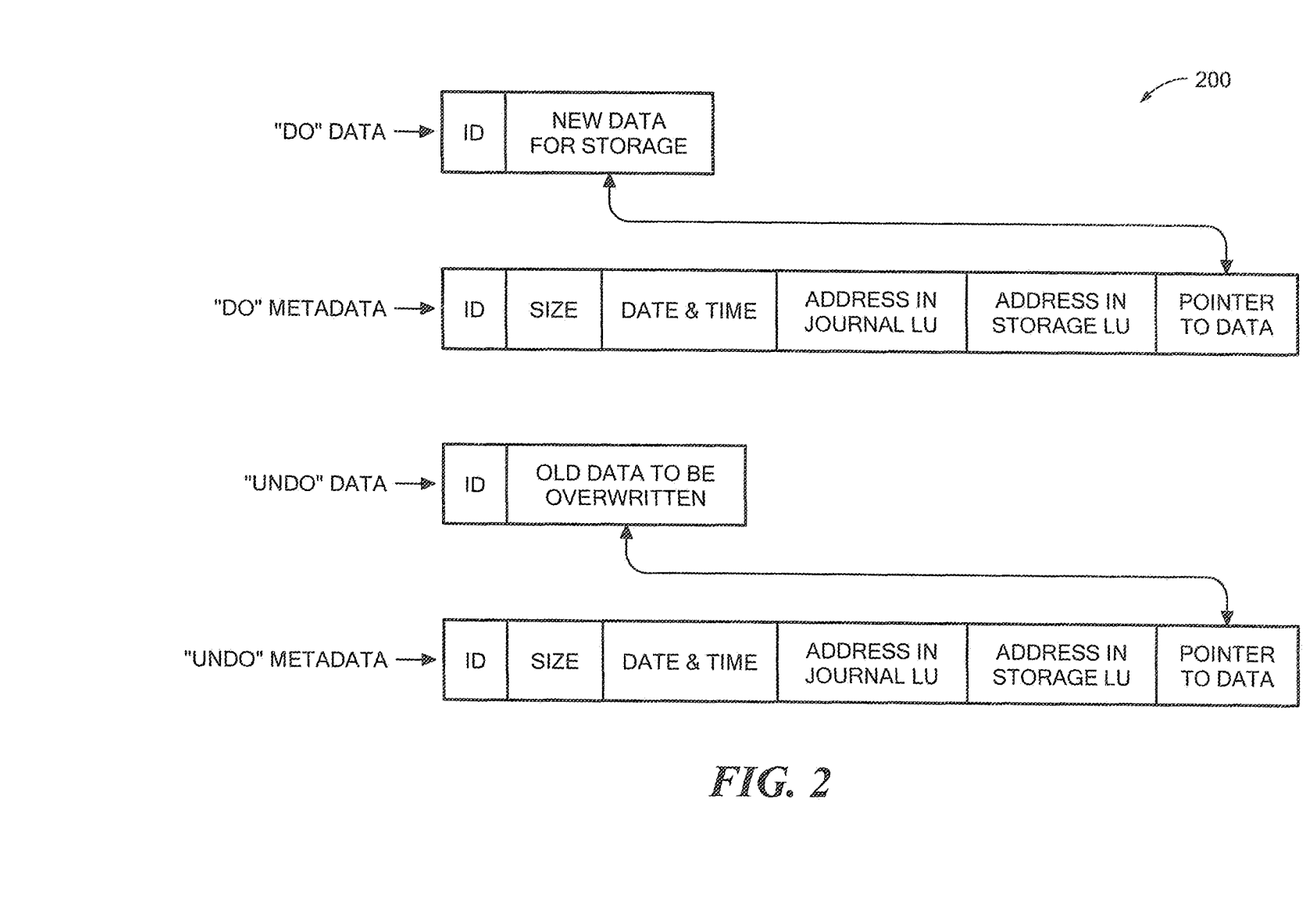
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
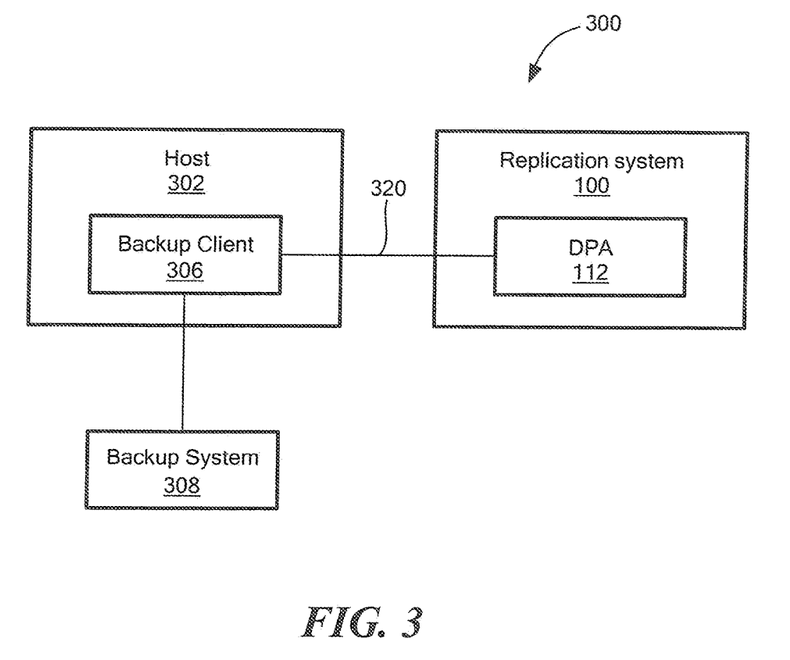
FIG. 3 is a block diagram of an example of a system to provide a persistent client-to-replication system.

Referring to FIG. 3, a system 300 includes a host 302, a backup system 308 and the DPA 112. The system 300 allows the backup client 306 to establish a connection 320 (e.g., a persistent secure shell session) with the replication system 100 through the DPA 112. This enables the backup client to save data into the backup systems 308. In particular, a user is able to initiate commands known to the replication system through the backup client 306. For example, a library of commands may be sent asynchronously to an active secure shell connection and can accomplish an array of snapshotting operations. For example, one command is to generate a bookmark for a point-in-time.

The system 300 includes functionality such that it can spawn an external binary in order to generate a Secure Shell connection to the replication system 100, redirect communications between the Secure Shell Session and a component library of the backup system, asynchronously keep track of I/Os to and from the Secure Shell Session, re-establish the Secure Shell Session if it is ever lost, facilitate translation of replication system response and clean-up the session and all resources when necessary.

Figure 4A:
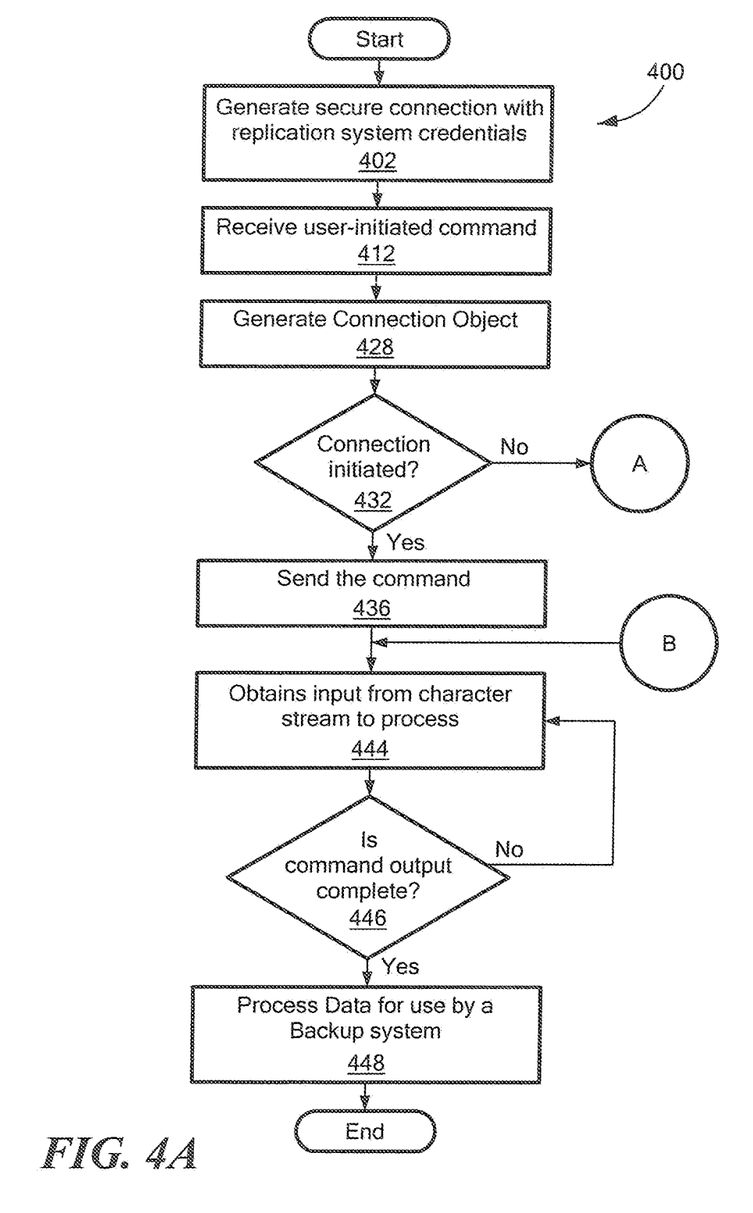
FIGS. 4A and 4B are a flowchart of an example of a process to form a persistent client-to-replication system communications.
Figure 4B:
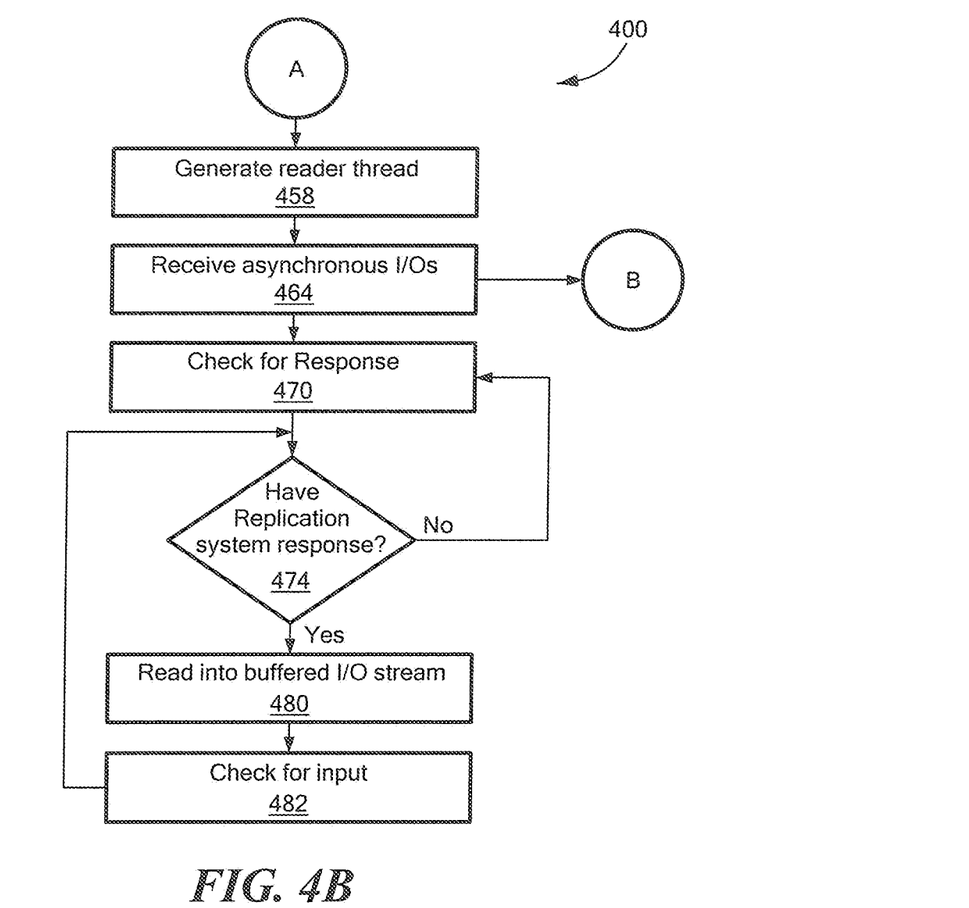

Referring to FIGS. 4A and 4B, an example of a process to form a persistent client-to-replication system communications is a process 400. In one example, process 400 enables creating, initializing and maintaining an active and secure connection to a single replication system.

Process 400 generates a secure connection with replication system credentials (402).

Process 400 receives a user initiated command (412) and generates a connection object (428). One of the purposes of processing block 428 is to persist data that is pertinent to the secure socket connection between the backup system 308 and the replication system 100 (e.g., DPA 112) and to assemble/translate the command to the replication system 100. The resulting memory chunks (located in volatile memory (not shown) then can be abstractly called a "Connection Object", which will remain for the life of the backup process.

The usage of memory pertaining to the connection object includes:

1) OS-specific read & write handles that redirects I/O to and from the Secure Shell & Backup System.

2) A buffer of characters (alpha-numeric data pertaining to Recovery System responses) containing filtered input from the Secure Shell Connection.

3) Connection flags to keep track of information sent to the Recovery System.

4) Internationalized error message to be used in case of an error that can be understood by the Backup System.

Process 400 determines if the connection is already initiated (432) and if it is already initiated, process 400 sends the command (436) and obtains input from a stream to process (444). For example, the character stream is a stream of characters from a memory location pointed to by the 'Connection Object' (e.g., operating system (OS)-specific read and write handles that redirects I/Os to and from a secure shell and backup system 308).

Process 400 constantly waits for data to pass through the secure shell connection so that it can filter the data output into the buffer of characters so that it can be parsed and consumed by the backup system 308. In one particular example, when using the replication system, the character stream includes alpha-numeric-punctuated characters in the form of an XML document.

Process 400 determines if the command output is complete (446) and, if so, processes data for consumption by backup system (448). For example, determining what parts of the output is important and parsable by the backup system 308, and then storing that information into the buffer of characters.

If the connection is not initiated, process 400 and generates a reader thread (458). For example, a reader thread is a process that is asynchronous to the backup system 308. In one example, the reader thread is dedicated to retrieving information through the already-established secure shell (generated in processing block 402). Thus, the backup system 308 never has to wait for a response from the replication system 100.

Process 400 receives asynchronous I/Os (464) and checks for response (470). For example, process 400 checks for a response from the replication system 100 for the command sent as a result of executing processing block 436. The replication system 100 is configured to provide at least an acknowledgement that it received a request from the backup system 308. In one particular example, the response is in an XML format and is obtained as a result of executing processing block 480 so that it can be asynchronously intercepted during execution of processing block 444 after it has been checked. Process 400 determines if it has the replication system response (474) and if it does, reads into the buffered I/O stream (480).

Process 400 checks for the input (482) and repeats processing block 474.

Figure 5:
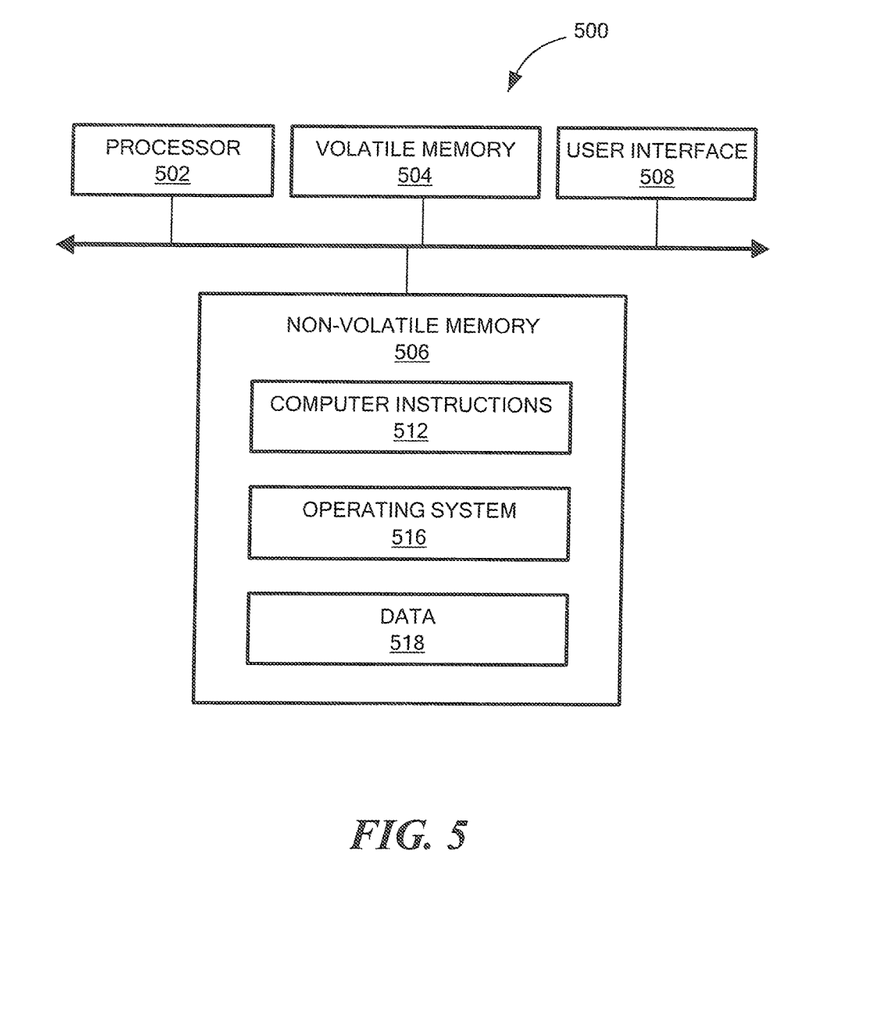
FIG. 5 is a simplified block diagram of an example of a computer on which any of the process in FIGS. 4A and 4B may be implemented.

Referring to FIG. 5, in one example, a computer includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400).

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 400 is not limited to the specific processing order of FIGS. 4A and 4B. Rather, any of the processing blocks of FIGS. 4A and 4B may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
generating a secure connection with a replication system using credentials;
receiving a user-initiated command to control the replication system;
generating a connection object;
determining if the connection to the replication system has been initiated;
sending the command to the replication system if the connection is initiated;
obtaining input from a character stream to process;
processing data for use by a backup system;
if the connection has not been initiated:
generating a reader thread;
receiving asynchronous I/Os;
checking for a response from the replication system; and
reading into a buffered I/O stream.

2. The method of claim 1, wherein generating a connection object enables persisting data that is pertinent to a secure socket connection between a backup system and the replication system.

3. The method of claim 1, wherein generating a connection object comprises generating a connection object to assemble and translate the command to the replication system.

4. The method of claim 1, wherein obtaining input from a character stream to process comprises obtaining input from a character stream comprising alpha-numeric-punctuated characters in an XML document.

5. The method of claim 1, wherein generating a connection object comprises generating a connection object wherein usage of memory pertaining to the connection object includes operating system (OS)-specific read and write handles that redirects I/Os to and from a secure shell and to a backup system.

6. The method of claim 1, further comprising:
generating an external binary to establish a secure shell connection to the replication system;
redirecting communications between the secure shell connection and a component library of the backup system;
asynchronously tracking I/Os to and from the secure shell connection; and
re-establishing the secure shell connection if secure shell connection is disconnected.

7. An apparatus, comprising:
electronic hardware circuitry configured to:
generate a secure connection with a replication system using credentials;
receive a user-initiated command to control the replication system;
generate a connection object;
determine if the connection to the replication system has been initiated;
send the command to the replication system if the connection is initiated;
obtain input from a character stream to process;
process data for use by a backup system;
generate a reader thread if the connection has not been initiated;
receive asynchronous I/Os if the connection has not been initiated;
check for a response from the replication system if the connection has not been initiated; and
read into a buffered I/O stream if the connection has not been initiated.

8. The apparatus of claim 7, wherein the circuitry comprises at least one of a processor, a memory, a programmable logic device or a logic gate.

9. The apparatus of claim 7, wherein the circuitry configured to generate a connection object enables persisting data that is pertinent to a secure socket connection between a backup system and the replication system.

10. The apparatus of claim 7, wherein the circuitry configured to generate a connection object comprises circuitry configured to generate a connection object to assemble and translate the command to the replication system.

11. The apparatus of claim 7, wherein the circuitry configured to obtain input from a character stream to process comprises circuitry configured to obtain input from a character stream comprising alpha-numeric-punctuated characters in an XML document.

12. The apparatus of claim 7, wherein the circuitry configured to generate a connection object comprises circuitry configured to generate a connection object wherein usage of memory pertaining to the connection object includes operating system (OS)-specific read and write handles that redirects I/Os to and from a secure shell and to a backup system.

13. An article comprising:
a non-transitory computer-readable medium that stores computer-executable instructions, the instructions causing a machine to:
generate a secure connection with a replication system using credentials;
receive a user-initiated command to control the replication system;
generate a connection object;
determine if the connection to the replication system has been initiated;
send the command to the replication system if the connection is initiated;
obtain input from a character stream to process;
process data for use by a backup system;

generate a reader thread if the connection has not been initiated;

receive asynchronous I/Os if the connection has not been initiated;

check for a response from the replication system if the connection has not been initiated; and read into a buffered I/O stream if the connection has not been initiated.

14. The article of claim 13, wherein the instructions causing the machine to generate a connection object enables persisting data that is pertinent to a secure socket connection between a backup system and the replication system.

15. The article of claim 13, wherein the instructions causing the machine to generate a connection object comprises instructions causing the machine to generate a connection object to assemble and translate the command to the replication system.

16. The article of claim 13, wherein the instructions causing the machine to obtain input from a character stream to process comprises instructions causing the machine to obtain input from a character stream comprising alpha-numeric-punctuated characters in an XML document.

17. The article of claim 13, wherein the instructions causing the machine to generate a connection object comprises instructions causing the machine to generate a connection object wherein usage of memory pertaining to the connection object includes operating system (OS)-specific read and write handles that redirects I/Os to and from a secure shell and to a backup system.

* * * * *